(12) United States Patent
Chan et al.

(10) Patent No.: US 6,788,032 B2
(45) Date of Patent: Sep. 7, 2004

(54) SOFTING SWITCHING DC-TO-DC CONVERTER WITH AN ACTIVE POWER SINK CIRCUIT

(75) Inventors: Chih-Chiang Chan, Taipei (TW); Yu-Ming Chang, Taoyuan (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 10/435,133

(22) Filed: May 9, 2003

(65) Prior Publication Data

US 2003/0210019 A1 Nov. 13, 2003

(30) Foreign Application Priority Data

May 13, 2002 (TW) .......................................... 9110994 A

(51) Int. Cl.[7] .................................................. G05F 1/10
(52) U.S. Cl. ...................... 323/222; 323/235; 323/225
(58) Field of Search ................................ 323/222, 225, 323/235, 247, 224, 239

(56) References Cited

U.S. PATENT DOCUMENTS 5,761,055 A * 6/1998 Okada et al. ............ 363/56.08
5,909,107 A * 6/1999 Aonuma et al. ............ 323/222

* cited by examiner

Primary Examiner—Shawn Riley

(57) ABSTRACT

The DC-to-DC converter including a boost converter circuit, a resonant circuit, and an active power sink circuit is provided. The boost converter circuit has a main switch for boosting a first DC voltage into a second DC voltage. The resonant circuit includes a unidirectional switch, a resonant capacitor, and a first winding of a transformer for causing the main switch to be controlled to exhibit near zero voltage switching. And, the active power sink circuit is magnetically coupled to the first winding of the transformer for draining energy in an inductance of the transformer off via magnetic induction between the active power sink circuit and the transformer, and causing the unidirectional switch to be controlled to exhibit near zero current switching.

12 Claims, 12 Drawing Sheets

SOFTING SWITCHING DC-TO-DC CONVERTER WITH AN ACTIVE POWER SINK CIRCUIT

FIELD OF THE INVENTION

The present invention relates to a DC-to-DC converter and more particularly to a DC-to-DC converter with an active power sink circuit.

BACKGROUND OF THE INVENTION

FIG. 1 is a schematic diagram illustrating a conventional pulse width modulation (PWM) boost converter 100. When a main switch 101 is turned on, a full bridge rectifier 102 outputs a DC power source to a main inductor 103. Thus power is transferred from the DC power source to the main inductor 103 and stored in the main inductor 103. Meanwhile, a main diode 104 is reverse biased. Once when a main switch 101 is turned on, power stored in main inductor 103 is transferred from the main inductor 103 to a main capacitor 105. In theoretical, by assuming that the main capacitor 105 is large enough and the main switch 101 is turned on and off fast and periodically, electrical energy can be stored in the main inductor 103 and transferred form the main inductor 103 into the main capacitor 105 promptly. Thus the voltage across the main capacitor 105 can be maintained at a constant voltage without load variation effect.

However, during the switching operation of the main switch 101 in the boost converter, the reverse recovery current of the main diode 104 will cause the main switch 101 and the main diode 104 have a serious switching loss such that the switching frequency cannot be increased to reduce the size of the main inductor of the boost converter. Please refer to FIG. 2. FIG. 2 is schematic diagram illustrating another conventional pulse width modulation (PWM) boost converter 200. The converter 200 is provided to solve the above drawback. Basically, a branch circuit which has an auxiliary inductor 206 and an auxiliary switch 207 is added into the converter 200 in order to eliminate the reverse recovery current of the main diode 204. When the auxiliary switch 207 is turned on, the power of a main power source Vs is stored in the auxiliary inductor 206 and it causes the electrical energy of a parallel-connected capacitor 208 of the main switch 201 to be totally discharged and stored in the auxiliary inductor 206. Thus the main switch 201 can be turned on under the zero voltage switching condition. Furthermore, when the auxiliary switch 207 is turned off, the electrical energy of the auxiliary inductor 206 is discharged form the auxiliary inductor 206 to a capacitor 205 through a diode 209. Therefore, this technique can solve the switching loss of the main switch 101 and the main diode 104 shown in FIG. 1, but the switching loss of the auxiliary switch 207 is still existed (the auxiliary switch 207 is turned off), and the EMI and the RFI problem will be generated. Meanwhile, the PWM boost converter 200 further includes a full bridge rectifier 202 which is utilized to transferred an AC voltage into a DC voltage as a main power of the PWM boost converter 200. By utilizing the conduction of the main switch 201, the main inductor 203 can be charged by the main power.

For the above reasons, a need still exists in the art of designing and manufacturing DC/DC converter to provide an optimal configuration for low switching loss. The improved converter configuration will be described in this invention as below.

SUMMARY OF THE INVENTION

It is therefore an object of the present invention to propose a DC-to-DC converter with an active power sink circuit for eliminating switching loss of a main switch of the DC-to-DC converter by utilizing a resonant circuit to turn on the main switch under the near zero voltage switching condition and an active power sink circuit to cause a unidirectional switch to be turned off the near zero current switching condition.

It is therefore another object of the present invention to propose a clamped-mode DC-to-DC converter for generating a low voltage output and a high current output by utilizing a combined transformer-inductor device and a synchronous rectification circuit in order to minimize the primary switch loss, synchronous rectifier loss, transformer winding loss and transformer core loss.

According to an aspect of the present invention, the DC-to-DC converter includes a boost converter circuit, a resonant circuit, and an active power sink circuit. The boost converter circuit has a main switch for boosting a first DC voltage into a second DC voltage. The resonant circuit includes a unidirectional switch, a resonant capacitor, and a first winding of a transformer for causing the main switch to be controlled to exhibit near zero voltage switching. And, the active power sink circuit is magnetically coupled to the first winding of the transformer for draining energy in an inductance of the transformer off via magnetic induction between the active power sink circuit and the transformer, and causing the unidirectional switch to be controlled to exhibit near zero current switching.

Preferably, the boost converter circuit further includes a main inductor, a main diode, and a main capacitor in which when the main switch is turned on, the first DC voltage charges the main inductor and the main diode is turned off, and when the main switch is turned off, the main diode is turned on and the first DC voltage and a voltage across the main inductor charges the main capacitor to produce the second DC voltage.

Preferably, the main inductor, a first terminal of the main switch, and an anode end of the main diode are connected to a first node, and the other terminal of the main inductor is electrically connected to the first DC voltage.

Preferably, a cathode end of the main diode and a positive terminal of the main capacitor are electrically connected to a second node, and the second node is an output terminal of the second DC voltage.

Preferably, a second terminal of the main switch and a negative terminal of the main capacitor are electrically connected to a third node.

Preferably, the active power sink circuit is a push-pull DC-to-DC converter including a fist switch, a second switch, and a rectified circuit. The fist switch is electrically connected to a second winding of the transformer in series, and a series circuit of the fist switch and the second winding of the transformer electrically connected between the third node and the second node. The second switch is electrically connected to a third winding of the transformer in series, and a series circuit of the second switch and the third winding of the transformer electrically connected between the third node and the second node. And, the rectified circuit includes a secondary winding of the transformer having a first terminal, a second terminal, and a central terminal, a first diode having an anode end electrically connected to the first terminal of the secondary winding, a second diode having an anode end electrically connected to the second terminal of the secondary winding, and a cathode end electrically connected to cathode end of the first diode, and a first capacitor having a positive terminal electrically connected to a common cathode end of the first diode and the second diode, and a negative terminal electrically connected to the central terminal.

Preferably, the resonant circuit includes a third diode.

Preferably, the third diode having a cathode end is electrically connected to the first winding, and the unidirectional switch in series, and a series circuit of the third diode, the first winding, and the unidirectional switch is in parallel with the main switch and the resonant capacitor.

Preferably, the resonant circuit further includes a resonant inductor electrically connected to the first winding and the third diode in series.

Preferably, the transformer has a leakage inductance.

Preferably, the active power sink circuit is a full bridge DC-to-DC converter.

It is therefore another aspect of the present invention to propose a DC-to-DC converter including a boost converter circuit, a resonant circuit, and an active power sink circuit. The boost converter circuit has a main switch for boosting a first DC voltage into a second DC voltage. The resonant circuit includes a unidirectional switch, a resonant capacitor, a resonant inductor, and a first winding of a transformer for causing the main switch to be controlled to exhibit near zero voltage switching. And, the active power sink circuit is magnetically coupled to the first winding of the transformer for draining energy in an inductance of the transformer off via magnetic induction between the active power sink circuit and the transformer, and causing the unidirectional switch to be controlled to exhibit near zero current switching.

The present invention may best be understood through the following description with reference to the accompanying drawings, in which:

DETAILED DESCRIPTION OF THE PREFERRED EMBODIMENT

Figure 1:
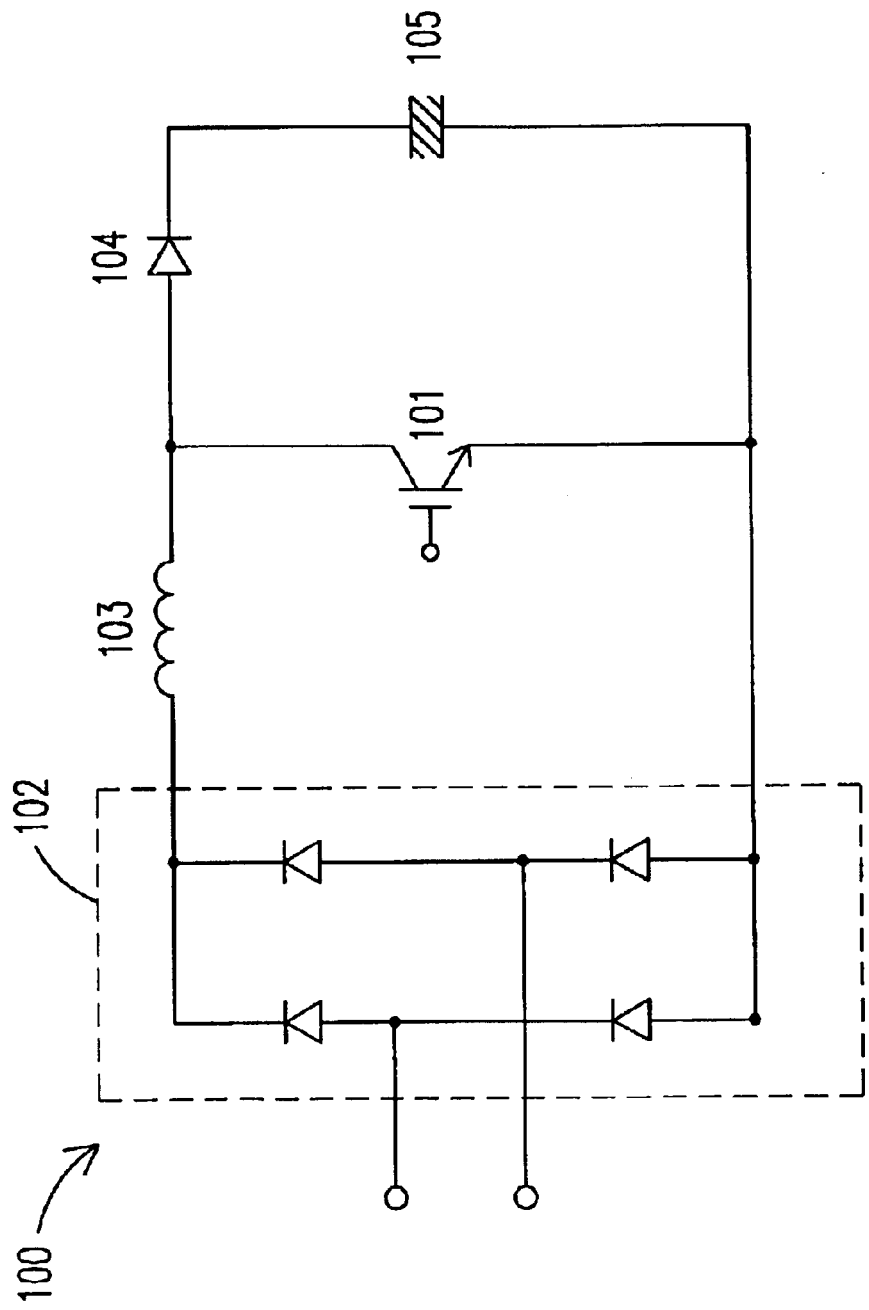
FIG. 1 is a schematic diagram illustrating a conventional pulse width modulation (PWM) boost converter according to the prior art.
Figure 2:
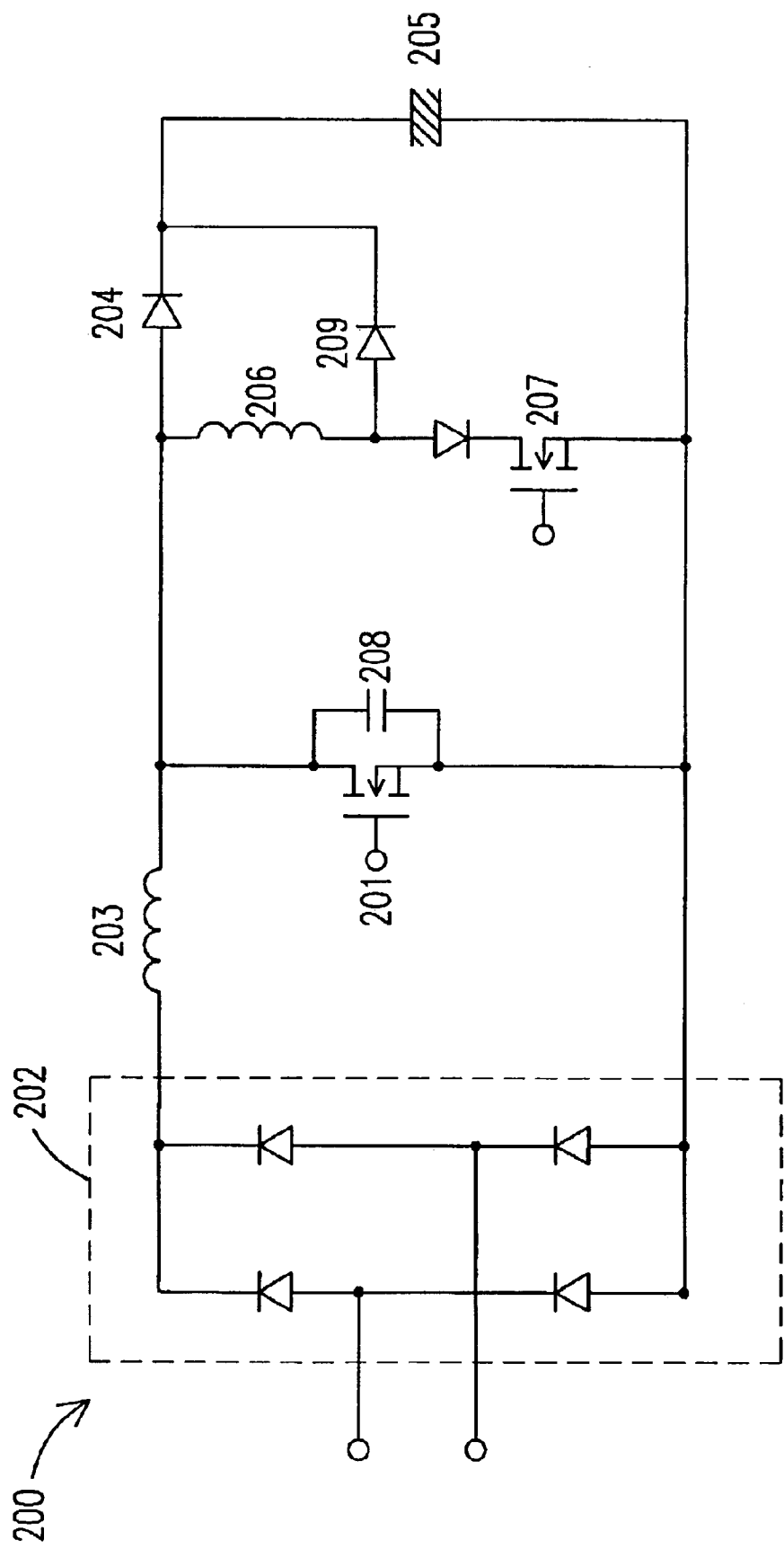
FIG. 2 is another schematic diagram illustrating a conventional pulse width modulation (PWM) boost converter according to the prior art.
Figure 3:
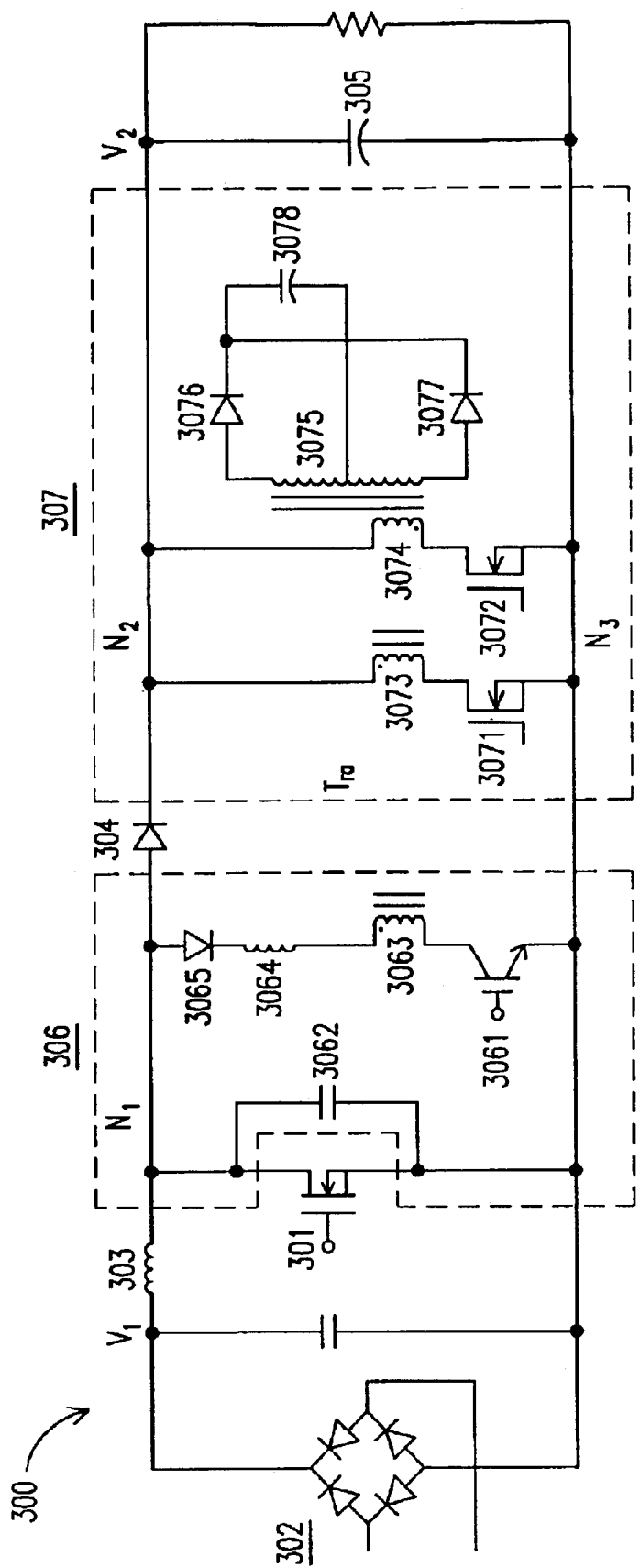
FIG. 3 is a schematic diagram of a DC-to-DC converter with an active power sink circuit according to a first preferred embodiment of the present invention.

Please refer to FIG. 3. It is a schematic diagram of a DC-to-DC converter with an active power sink circuit according to a first preferred embodiment of the present invention. As shown in FIG. 3, a DC-to-DC converter 200 includes a boost converter circuit, a resonant circuit 306, and an active power sink circuit 307. The boost converter circuit has a main switch 301, a main inductor 303, a main diode 304, and a main capacitor 305 for boosting a first DC voltage $V_1$ into a second DC voltage $V_2$. Meanwhile, the first DC voltage $V_1$ is rectified and filtering from an AC voltage by a full bridge rectifier and a filtering capacitor. In this invention, the first DC voltage $V_1$ can be a DC voltage with a voltage ripple or a DC voltage without a voltage ripple.

When the main switch 301 is turned on, the first DC voltage V1 charges the main inductor 303. Meanwhile, the main diode 304 is turned off. When the main switch 301 is turned off, the main diode 304 is turned on and the first DC voltage V1 and the voltage across the main inductor 303 charge the main capacitor 305 to generate the second DC voltage $V_2$.

The main inductor 303, a first terminal of the main switch 301, and an anode end of the main diode 304 are connected to a first node $N_1$, and the other terminal of the main inductor 303 is electrically connected to the first DC voltage $V_1$. A cathode end of the main diode 304 and a positive terminal of the main capacitor 305 are electrically connected to a second node $N_2$, and the second node $N_2$ is an output terminal of the second DC voltage $V_2$. A second terminal of the main switch 301 and a negative terminal of the main capacitor 305 are electrically connected to a third node $N_3$.

The resonant circuit 306 includes a unidirectional switch 3061, a resonant capacitor 3062, a third diode 3065, a resonant inductor 3064, and a first winding 3063 of a transformer $T_{ra}$. The resonant circuit 306 is used for causing the main switch 301 to be controlled to exhibit near zero voltage switching. And, the active power sink circuit 307 is magnetically coupled to the first winding 3063 of the transformer $T_{ra}$ for draining energy in an inductance of the transformer $T_{ra}$ off via magnetic induction between the active power sink circuit 307 and the transformer $T_{ra}$, and causing the unidirectional switch 301 to be controlled to exhibit near zero current switching.

Furthermore, the third diode 3065 has a cathode end is electrically connected to the resonant inductor 3064. The third diode 3065, the resonant inductor 3064, the first winding 3063, and the unidirectional switch 3061 are connected in series, and the series circuit thereof is in parallel with the main switch 301 and the resonant capacitor 3062.

Preferably, the active power sink circuit can be a push-pull DC-to-DC converter or a full bridge DC-to-DC converter. The active power sink circuit 307 includes a fist switch 3071, a second switch 3072, and a rectified circuit. The fist switch 3071 is electrically connected to a second winding 3073 of the transformer $T_{ra}$ in series, and a series circuit of the fist switch 3071 and the second winding 3073 of the transformer $T_{ra}$ is electrically connected between the third node $N_3$ and the second node $N_2$. The second switch 3072 is electrically connected to a third winding 3074 of the transformer $T_{ra}$ in series, and a series circuit of the second switch 3072 and the third winding 3074 of the transformer $T_{ra}$ is electrically connected between the third node $N_3$ and the second node $N_2$. And, the rectified circuit includes a secondary winding 3075 of the transformer $T_{ra}$ having a first terminal, a second terminal, and a central terminal, a first diode 3076 having an anode end electrically connected to the first terminal of the secondary winding 3075, the second diode 3077 having an anode end electrically connected to the second terminal of the secondary winding 3075, and a cathode end electrically connected to cathode end of the first diode 3076, and a first capacitor 3078 having a positive terminal electrically connected to a common cathode end of the first diode 3076 and the second diode 3077, and a negative terminal electrically connected to the central terminal. Meanwhile, the transformer can be a transformer with a leakage inductance.

Figure 4A:
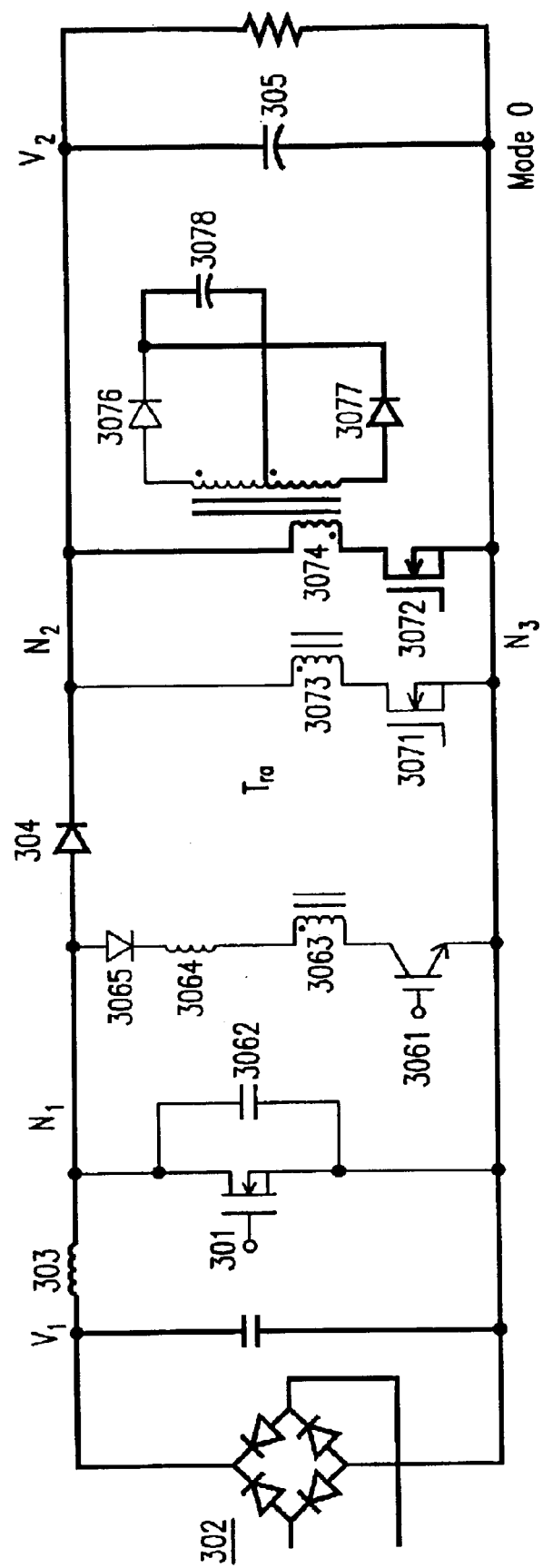
FIGS. 4(a)~(h) illustrate the different operation modes of FIG. 3.

Please refer to FIGS. 4(a)~(h) which illustrate the different operation modes of FIG. 3. The main working principle is shown as follows:

Mode 0: As shown in FIG. 4(a), the operation mode is the same to that of the conventional PWM boost converter which operates under a discharge mode. The electrical energy stored in the main inductor 303 is discharged to the main capacitor 305 through the main diode 304. Because the second switch 3072 is turned on, the active power sink circuit 307 receives the power transfer from the transformer $T_{ra}$ to the first capacitor 3078 through the second diode 3077. The output of the first capacitor 3078 can be used for providing a power source of a fan, a protection circuit or a monitoring circuit.

Figure 4B:
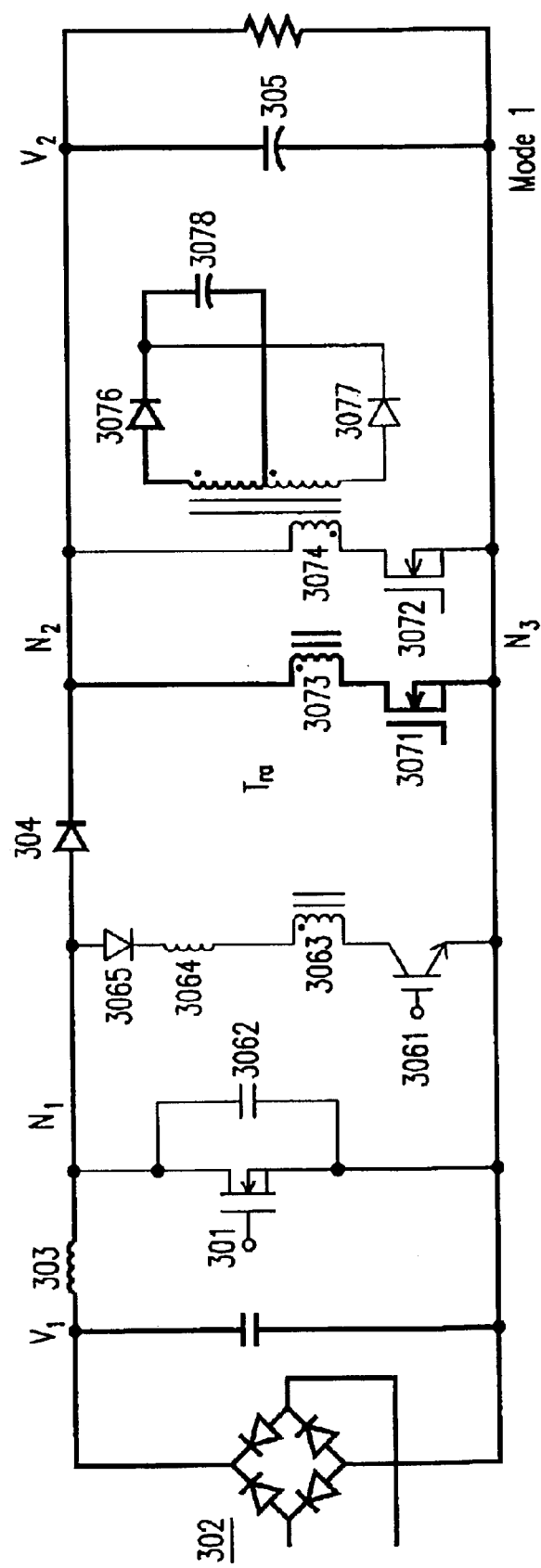

Mode 1: As shown in FIG. 4(b), the second switch 3072 is turned off, the exciting energy of the transformer $T_r$a turns on the body diode of the first switch 3071, and thus the exciting energy is transferred from the transformer $T_{ra}$ to the first capacitor 3078 through the first diode 3076. During the conduction state of the body diode, the first switch 3071 is turned on by an enable signal to cause the first switch 3071 to be controlled to exhibit zero voltage switching. (Assuming that the exciting inductor of the auxiliary transformer is very large, and the equivalent output capacitor of the first switch 3071 and the second switch 3072 can be neglect ed.)

Figure 4C:
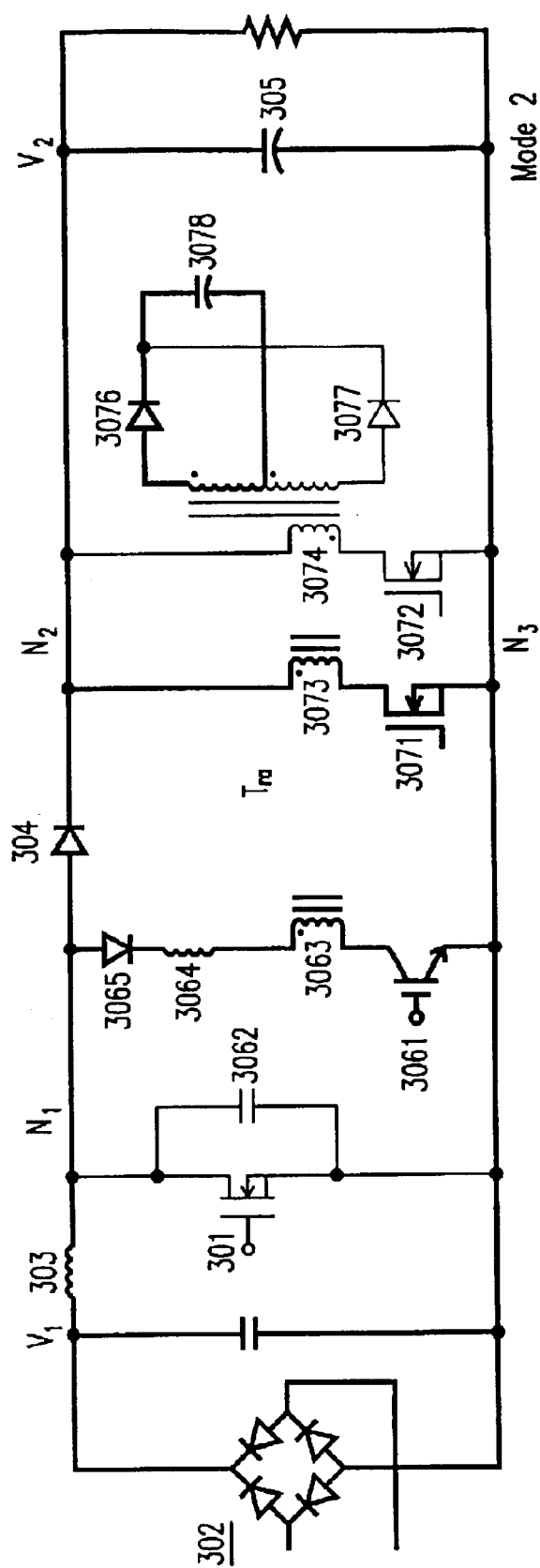

Mode 2: As shown in FIG. 4(c), when the unidirectional switch 3061 is to be turned on under zero current switching condition, the current of the resonant inductor 3064 is increased linearly. When the current of the resonant inductor 3064 is increased until the current of the main diode 304 approaches zero, the main diode 304 is turned off and to be controlled to exhibit zero current switching, and the operating mode is terminated.

Figure 4D:
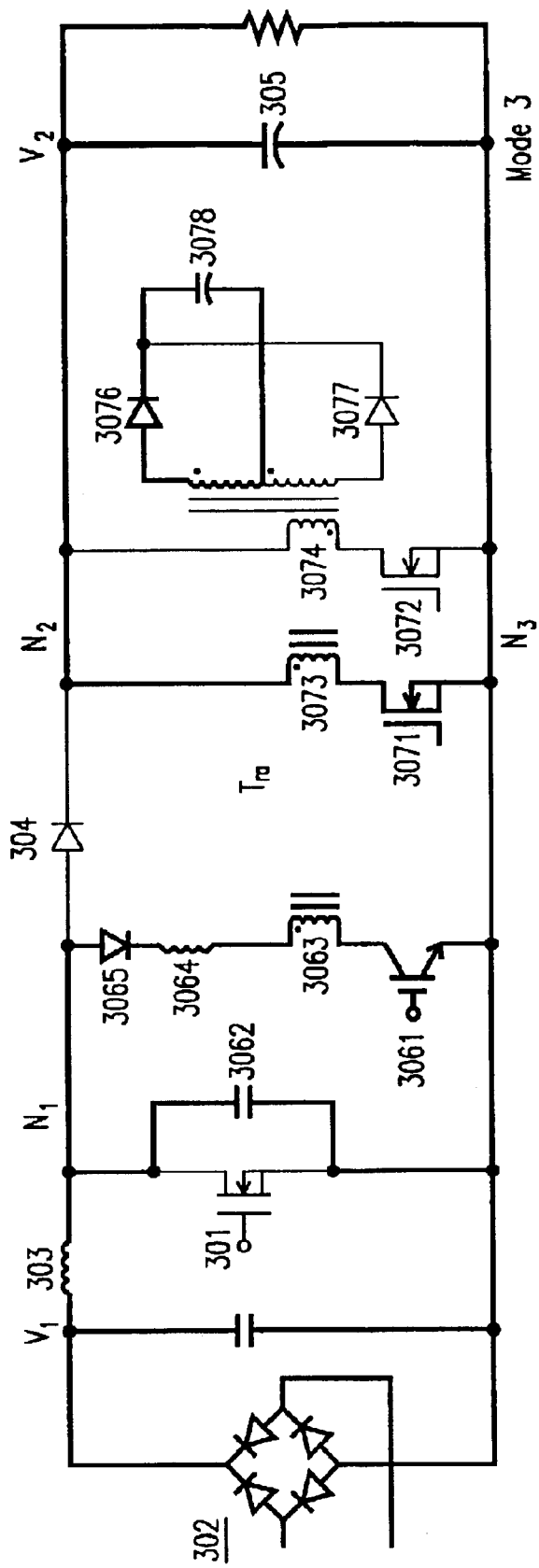

Mode 3: As shown in FIG. 4(d), when the main diode 304 is turned off, the electrical energy is resonated among the resonant capacitor 3062, the transformer $T_{ra}$, and the resonant inductor 3064. The resonant behavior leads the energy of the resonant capacitor 3062 totally released until zero and part of energy is discharged to the first capacitor 3078 and the main capacitor 305 through the transformer $T_{ra}$. The operating mode is terminated until the voltage of the resonate capacitor 3062 is discharged to zero.

Figure 4E:
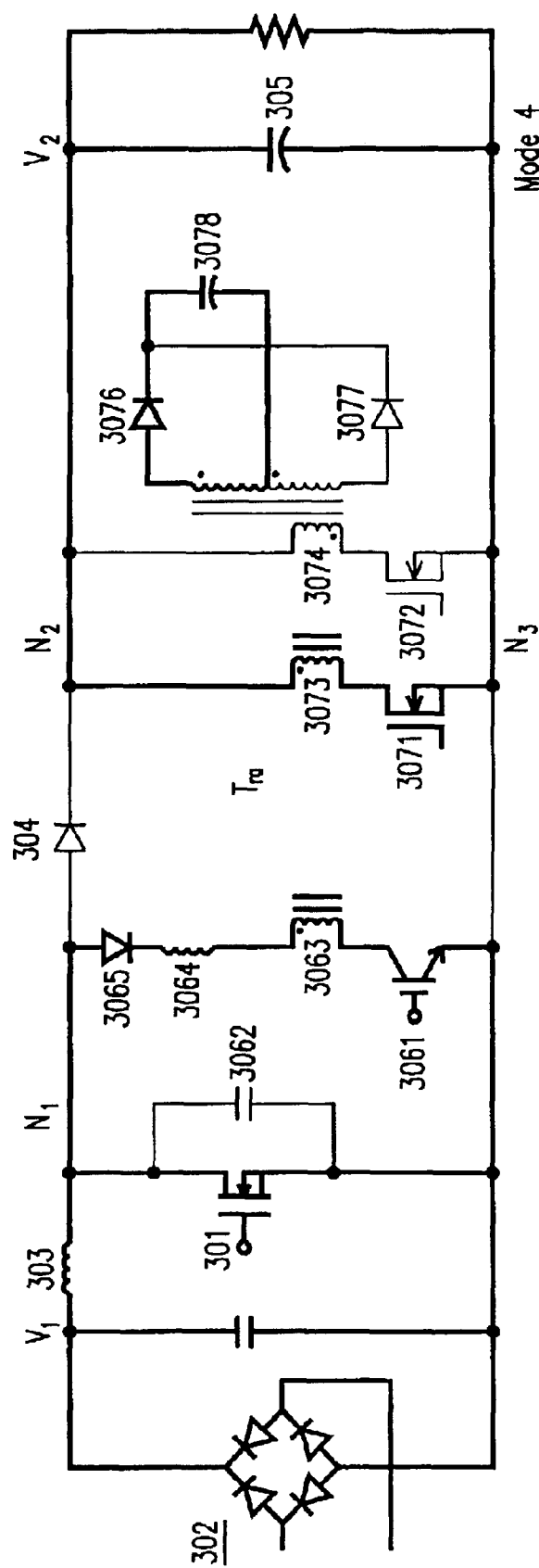

Mode 4: As shown in FIG. 4(e), when the voltage of the resonant capacitor 3062 approaches zero, the main switch 301 is driven to be turned on. Thus the main switch 301 is turned on under the zero voltage switching condition. The energy of the resonant inductor 3064 is linearly discharged to the first capacitor 3078 and the main capacitor 305 through the transformer $T_{ra}$. When the energy of the resonant inductor 3064 is totally discharged to zero, the operating mode is terminated. Because the switch 3061 is a unidirectional switch, the switch 3061 is naturally turned of under the zero current switching condition, even though the control signal of the switch 3061 remains at a high voltage.

Figure 4F:
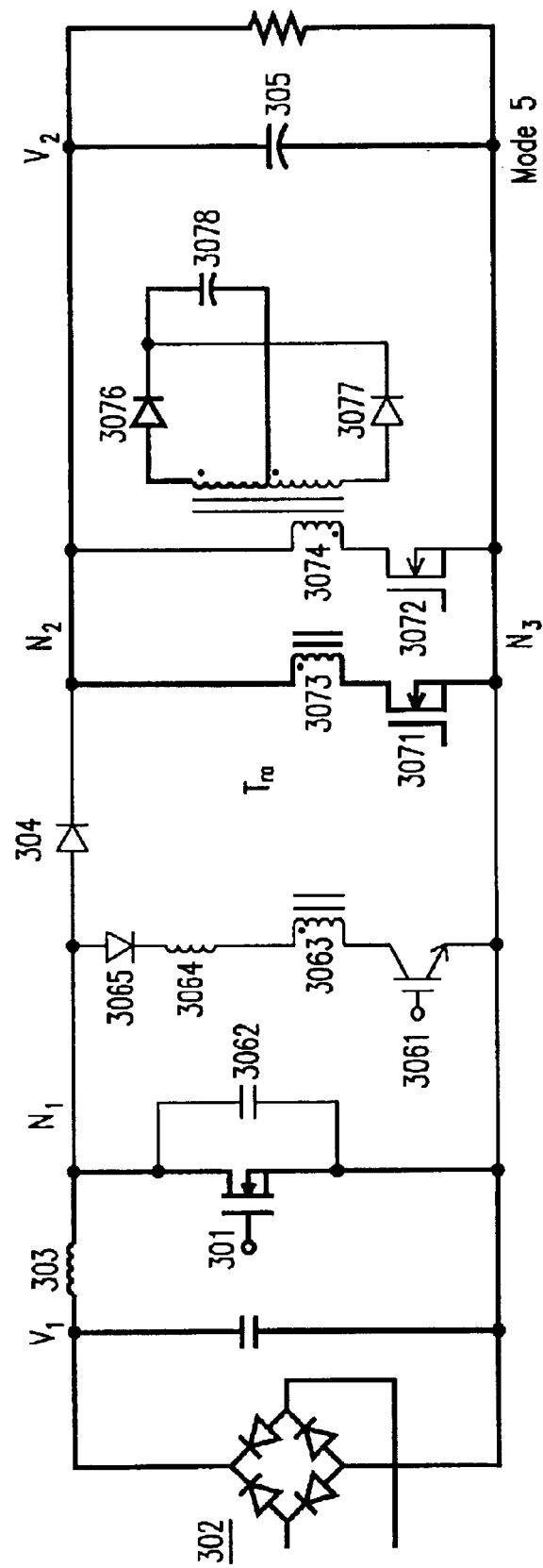

Mode 5: As shown in FIG. 4(f), the operating mode starts when the energy of the inductor 3064 is discharged to zero. The operating mode is the same to that of the conventional PWM boost converter which operates under charging mode.

Figure 4G:
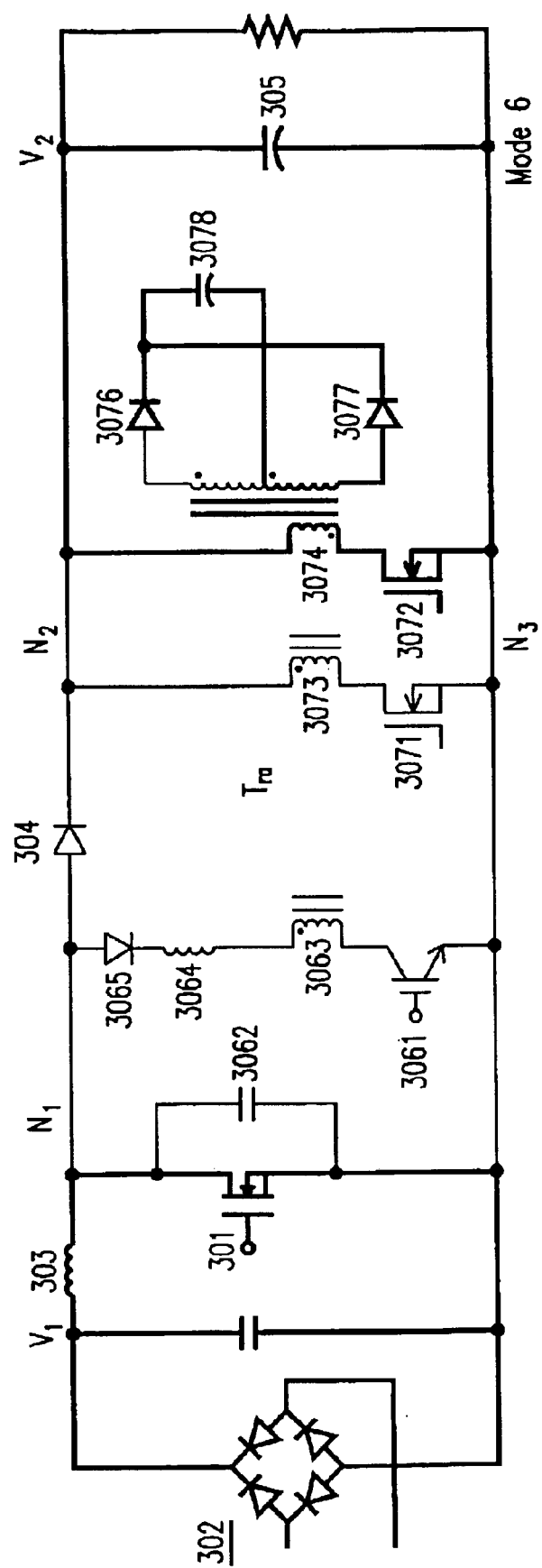

Mode 6: As shown in FIG. 4(g), when the main switch 301 remains turned on, and the first switch 3071 is turned off, the second switch 3072 is turned on under the zero voltage switching by the exciting energy. The operating mode is terminated until the main switch 301 is turned off.

Figure 4H:
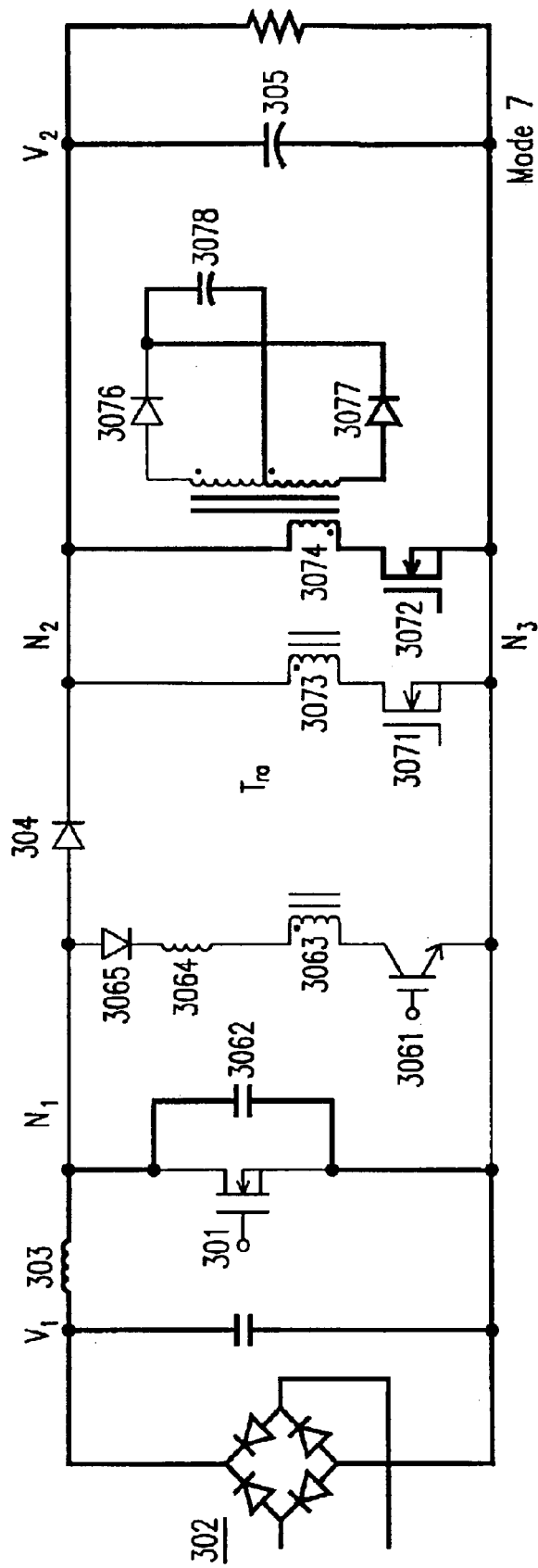

Mode 7: As shown in FIG. 4(h), when the main switch 301 is turned off, the energy of the main inductor 303 charges the resonant capacitor 3062. The voltage of the resonant capacitor 3062 is increased linearly. When the voltage of the resonant capacitor 3062 equals to the second voltage $V_2$, the operating mode is terminated.

Additionally, the first switch 3071 and the second switch 3072 are turned on under 50% duty cycle.

Figure 5:
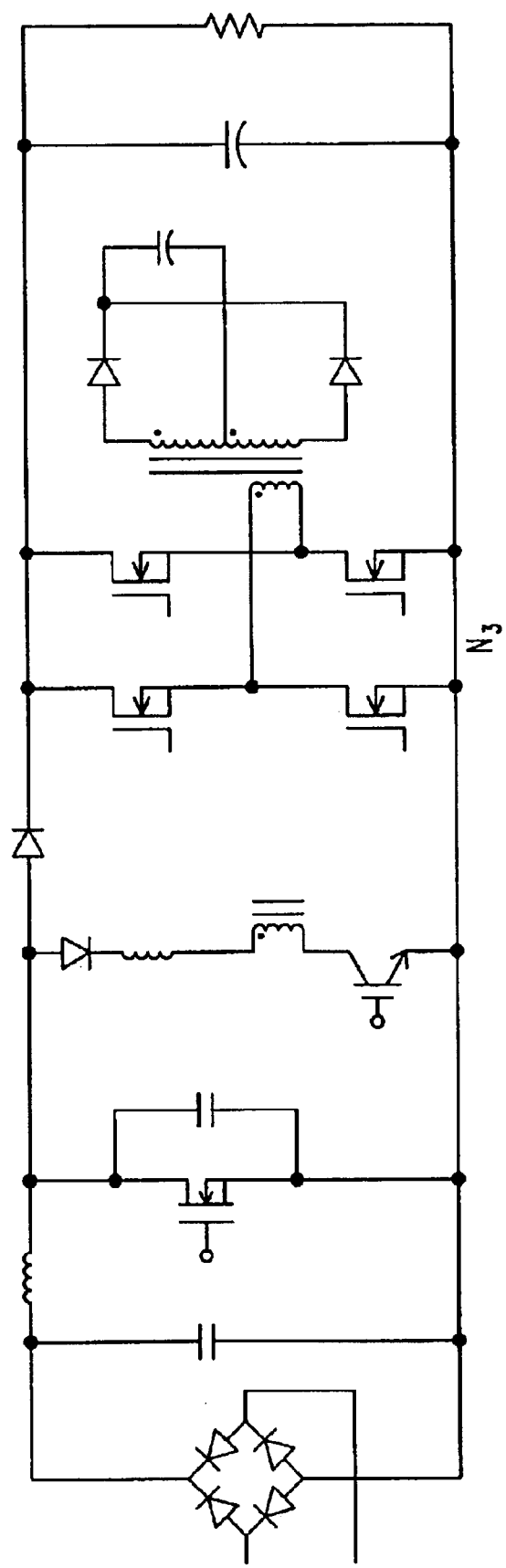
FIG. 5 is a schematic diagram of a DC-to-DC converter with an active power sink circuit according to a second preferred embodiment of the present invention.

Please refer to FIG. 5 which illustrates a schematic diagram of a DC-to-DC converter with an active power sink circuit according to a second preferred embodiment of the present invention. The major difference between the first preferred embodiment and the second preferred embodiment is that the active power sink circuit is a full bridge DC-to-DC converter.

Owing to above descriptions, the present invention can provide a DC-to-DC converter with an active power sink circuit to eliminate the switching loss of the DC-to-DC converter. Therefore, the present invention can solve the drawbacks of the prior art and has the practical utility in industry.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A DC-to-DC converter, comprising:
   a boost converter circuit having a main switch for boosting a first DC voltage into a second DC voltage;
   a resonant circuit including an unidirectional switch, a resonant capacitor, and a first winding of a transformer for causing said main switch to be controlled to exhibit near zero voltage switching; and
   an active power sink circuit magnetically coupled to said first winding of said transformer for draining energy in an inductance of said transformer off via magnetic induction between said active power sink circuit and said transformer, and causing said unidirectional switch to be controlled to exhibit near zero current switching.

2. The DC-to-DC converter according to claim 1, wherein said boost converter circuit further comprises a main inductor, a main diode, and a main capacitor in which when said main switch is turned on, said first DC voltage charges said main inductor and said main diode is turned off, and when said main switch is turned off, said main diode is turned on and said first DC voltage and a voltage across said main inductor charges said main capacitor to produce said second DC voltage.

3. The DC-to-DC converter according to claim 2, wherein said main inductor, a first terminal of said main switch, and an anode end of said main diode are connected to a first node, and the other terminal of said main inductor is electrically connected to said first DC voltage.

4. The DC-to-DC converter according to claim 3, wherein a cathode end of said main diode and a positive terminal of said main capacitor are electrically connected to a second node, and said second node is an output terminal of said second DC voltage.

5. The DC-to-DC converter according to claim 4, wherein a second terminal of said main switch and a negative terminal of said main capacitor are electrically connected to a third node.

6. The DC-to-DC converter according to claim 5, wherein said active power sink circuit is a push-pull DC-to-DC converter, comprising:
   a fist switch electrically connected to a second winding of said transformer in series, and a series circuit of said fist switch and said second winding of said transformer electrically connected between said third node and said second node;

a second switch electrically connected to a third winding of said transformer in series, and a series circuit of said second switch and said third winding of said transformer electrically connected between said third node and said second node; and a rectified circuit, comprising:
  a secondary winding of said transformer having a first terminal, a second terminal, and a central terminal;
  a first diode having an anode end electrically connected to said first terminal of said secondary winding;
  a second diode having an anode end electrically connected to said second terminal of said secondary winding, and a cathode end electrically connected to cathode end of said first diode; and
  a first capacitor having a positive terminal electrically connected to a common cathode end of said first diode and said second diode, and a negative terminal electrically connected to said central terminal.

7. The DC-to-DC converter according to claim 1, wherein said resonant circuit comprises a third diode.

8. The DC-to-DC converter according to claim 7, wherein said third diode having a cathode end is electrically connected to said first winding, and said unidirectional switch in series, and a series circuit of said third diode, said first winding, and said unidirectional switch is in parallel with said main switch and said resonant capacitor.

9. The DC-to-DC converter according to claim 8, wherein said resonant circuit further comprises a resonant inductor electrically connected to said first winding and said third diode in series.

10. The DC-to-DC converter according to claim 8, wherein said transformer has a leakage inductance.

11. The DC-to-DC converter according to claim 1, wherein said active power sink circuit is a full bridge DC-to-DC converter.

12. A DC-to-DC converter, comprising:
  a boost converter circuit having a main switch for boosting a first DC voltage into a second DC voltage;
  a resonant circuit including an unidirectional switch, a resonant capacitor, a resonant inductor, and a first winding of a transformer for causing said main switch to be controlled to exhibit near zero voltage switching; and
  an active power sink circuit magnetically coupled to said first winding of said transformer for draining energy in an inductance of said transformer off via magnetic induction between said active power sink circuit and said transformer, and causing said unidirectional switch to be controlled to exhibit near zero current switching.

* * * * *